(12) United States Patent
Malcolm

(10) Patent No.: US 10,687,603 B1
(45) Date of Patent: Jun. 23, 2020

(54) DECORATIVE SHOWERHEAD AND MIRROR

(71) Applicant: David B. Malcolm, Coarsegold, CA (US)

(72) Inventor: David B. Malcolm, Coarsegold, CA (US)

( * ) Notice: Subject to any disclaimer, the term of this patent is extended or adjusted under 35 U.S.C. 154(b) by 0 days.

(21) Appl. No.: 15/095,732

(22) Filed: Apr. 11, 2016

(51) Int. Cl.
| | | |
|---|---|---|
| *A45D 42/16* | (2006.01) | |
| *B05D 1/18* | (2006.01) | |
| *G02B 27/00* | (2006.01) | |
| *B05B 1/18* | (2006.01) | |

(52) U.S. Cl.
CPC ............. *A45D 42/16* (2013.01); *B05B 1/185* (2013.01); *G02B 27/0006* (2013.01)

(58) Field of Classification Search
CPC ........... B05B 1/18; B05B 1/185; A45D 42/16; G02B 27/0006
See application file for complete search history.

(56) References Cited

U.S. PATENT DOCUMENTS

| | | | | |
|---|---|---|---|---|
| 1,832,724 | A * | 11/1931 | Mueller ................. | B05B 1/3046 239/539 |
| 4,191,332 | A | 3/1980 | De Langis et al. | |
| 5,032,015 | A * | 7/1991 | Christianson ............ | A47G 1/02 359/512 |
| 5,953,157 | A * | 9/1999 | Christianson ........ | G02B 7/1815 359/507 |
| 6,036,110 | A * | 3/2000 | Kanatzar ................. | E03C 1/046 239/317 |
| 6,799,335 | B1 * | 10/2004 | Zadro .................. | G02B 7/1815 359/509 |
| 7,185,830 | B2 | 3/2007 | Malcolm | |
| 8,667,623 | B2 * | 3/2014 | Paget ........................ | B05B 1/18 239/289 |
| 2008/0295242 | A1 * | 12/2008 | Tsai .......................... | B05B 1/18 4/615 |
| 2011/0089259 | A1 * | 4/2011 | Paget ........................ | B05B 1/18 239/289 |
| 2016/0154235 | A1 * | 6/2016 | Stapleton ........... | G02B 27/0006 359/512 |

OTHER PUBLICATIONS

Hiconsumption, Shaving Showerhead Mirror by Reflect, Jul. 28, 2012.

* cited by examiner

*Primary Examiner* — Christopher S Kim
(74) *Attorney, Agent, or Firm* — Mark D. Miller

(57) ABSTRACT

A showerhead that is attached to a shower arm which extends outward from a wall in a shower to support a base and/or a mirror. The base is provided for decorative purposes or to support the mirror. The mirror provides a mirrored surface that can be utilized by a person taking a shower to more safely, efficiently and effectively shave and/or accomplish other grooming tasks. The mirror attaches to the base, directly to the showerhead or to a tubular post that interconnects the showerhead and the base or mirror. Water from the showerhead discharges through the mirror. In either configuration, the mirror is more securely positioned in the shower so it will not drop to the shower floor. Hot water flowing through the mirror reduces fogging of the mirrored surface. In one configuration, the base is made out metal to further reduce the likelihood of fogging.

17 Claims, 6 Drawing Sheets

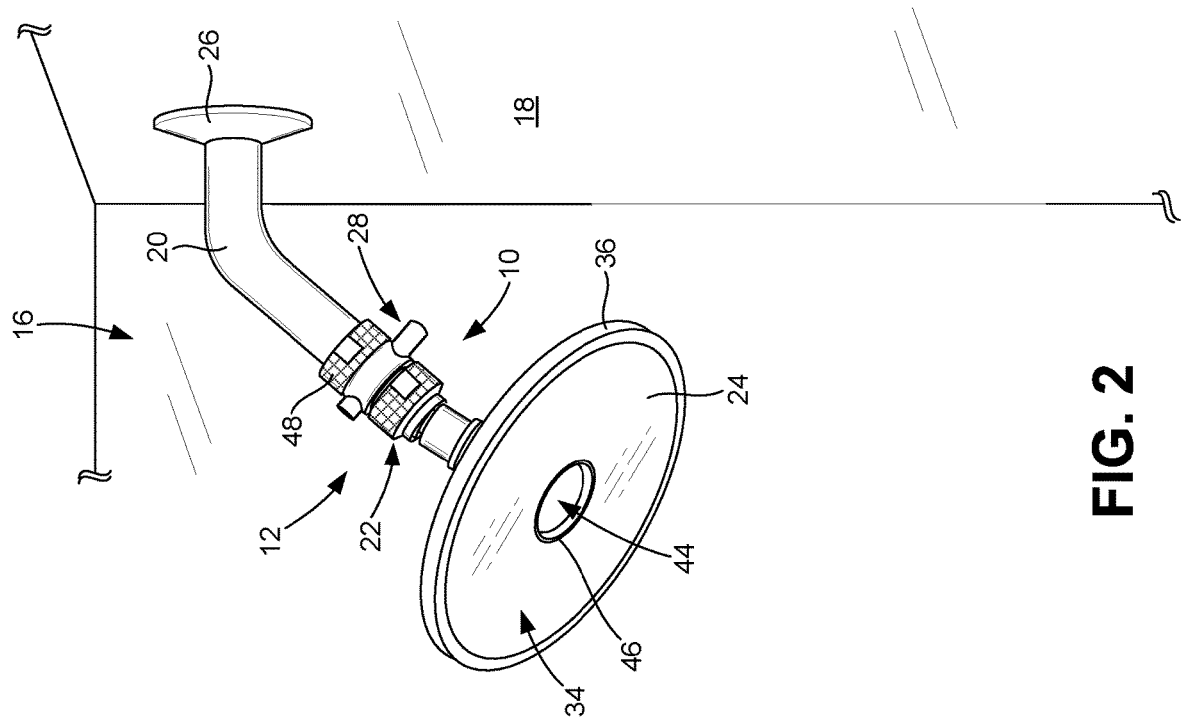
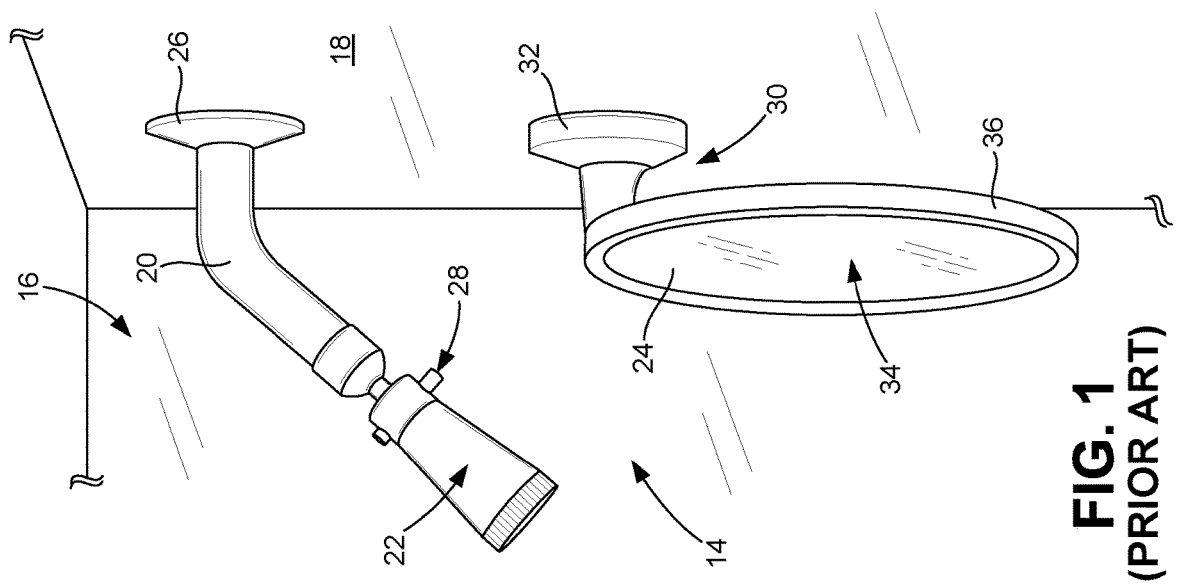
FIG. 2
FIG. 1
(PRIOR ART)

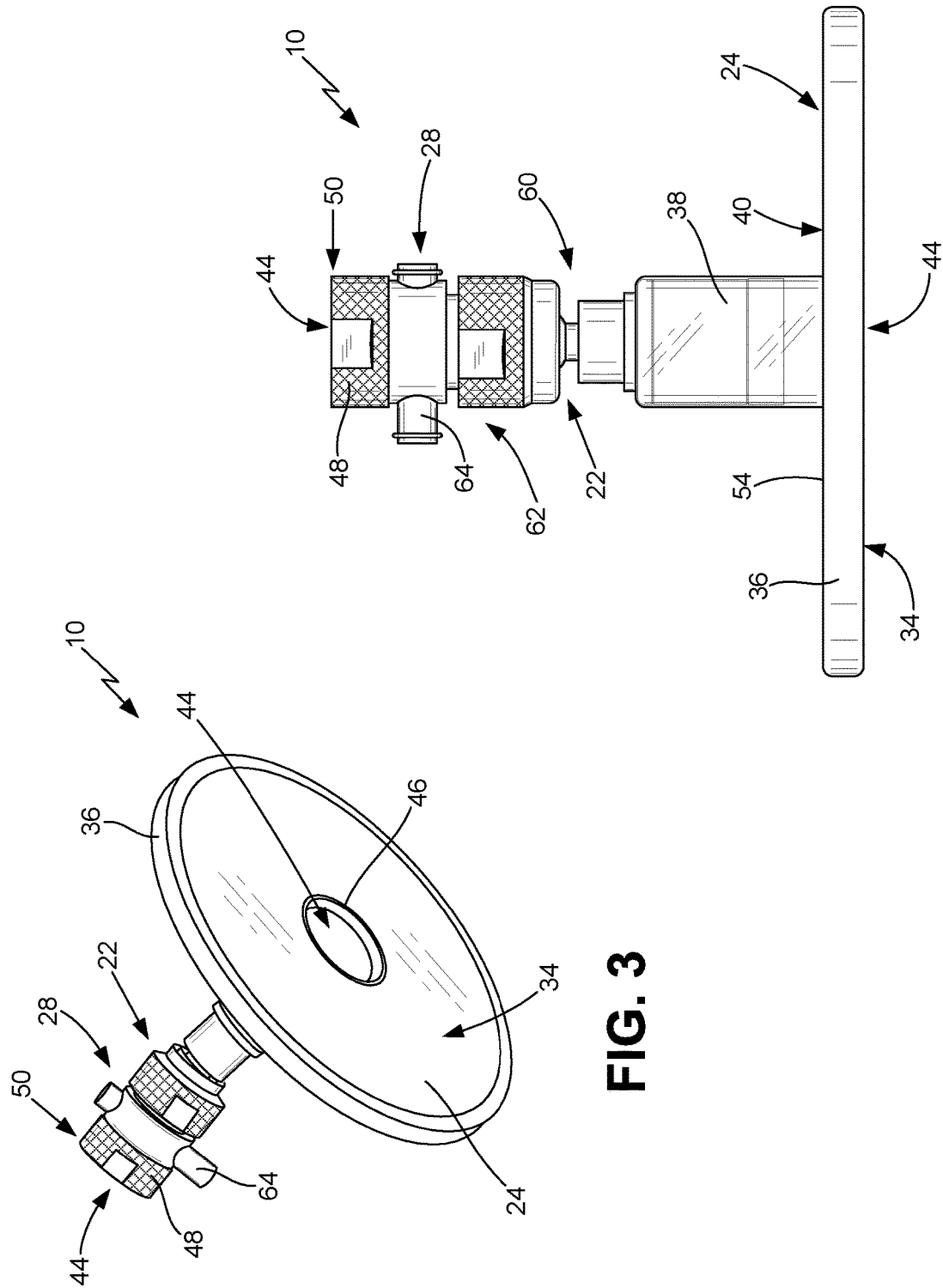

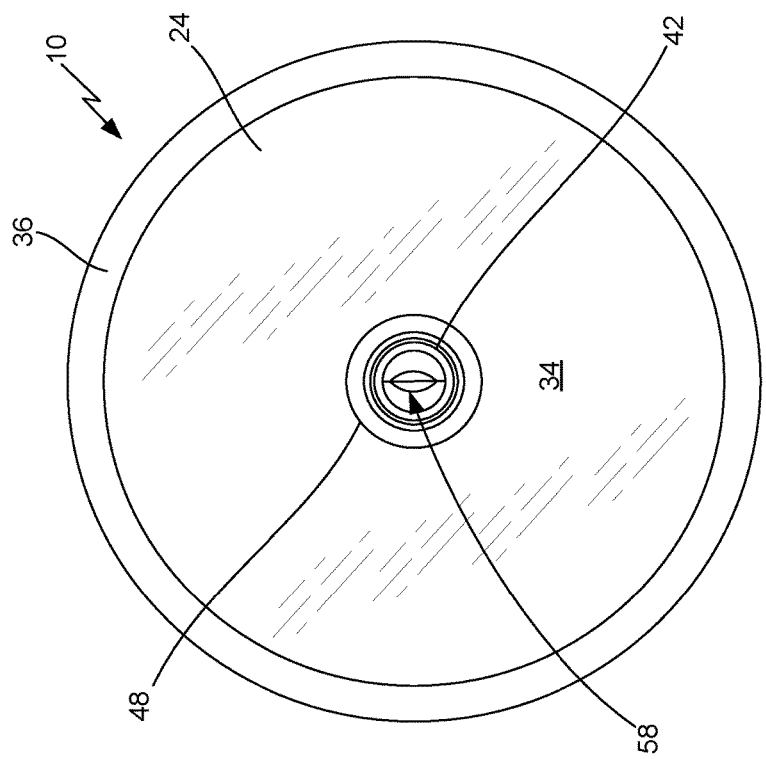
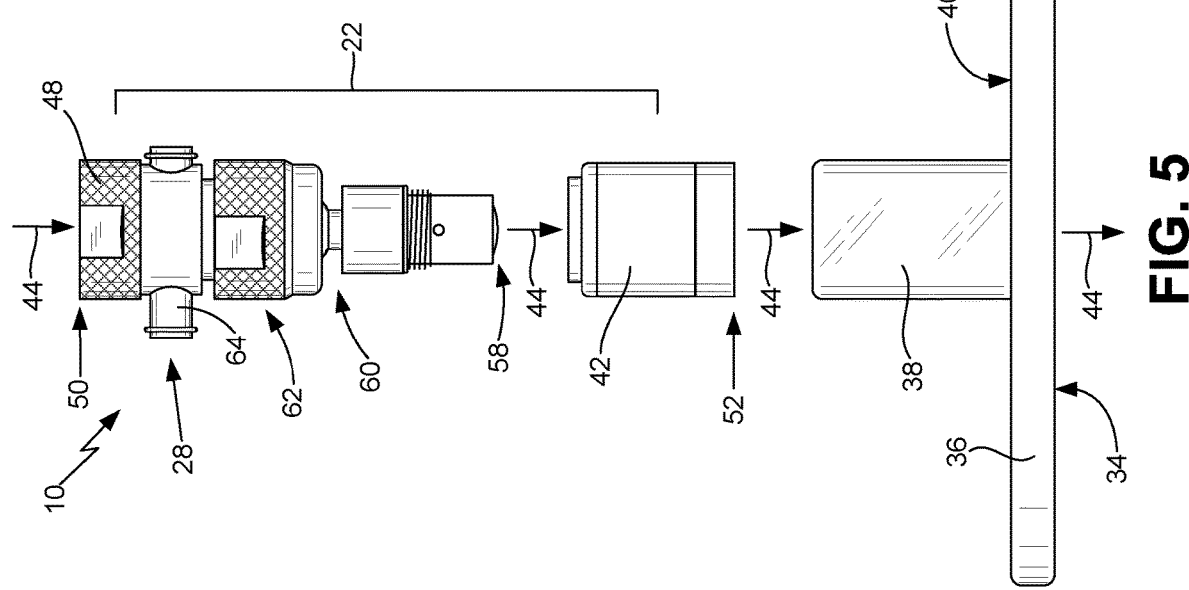

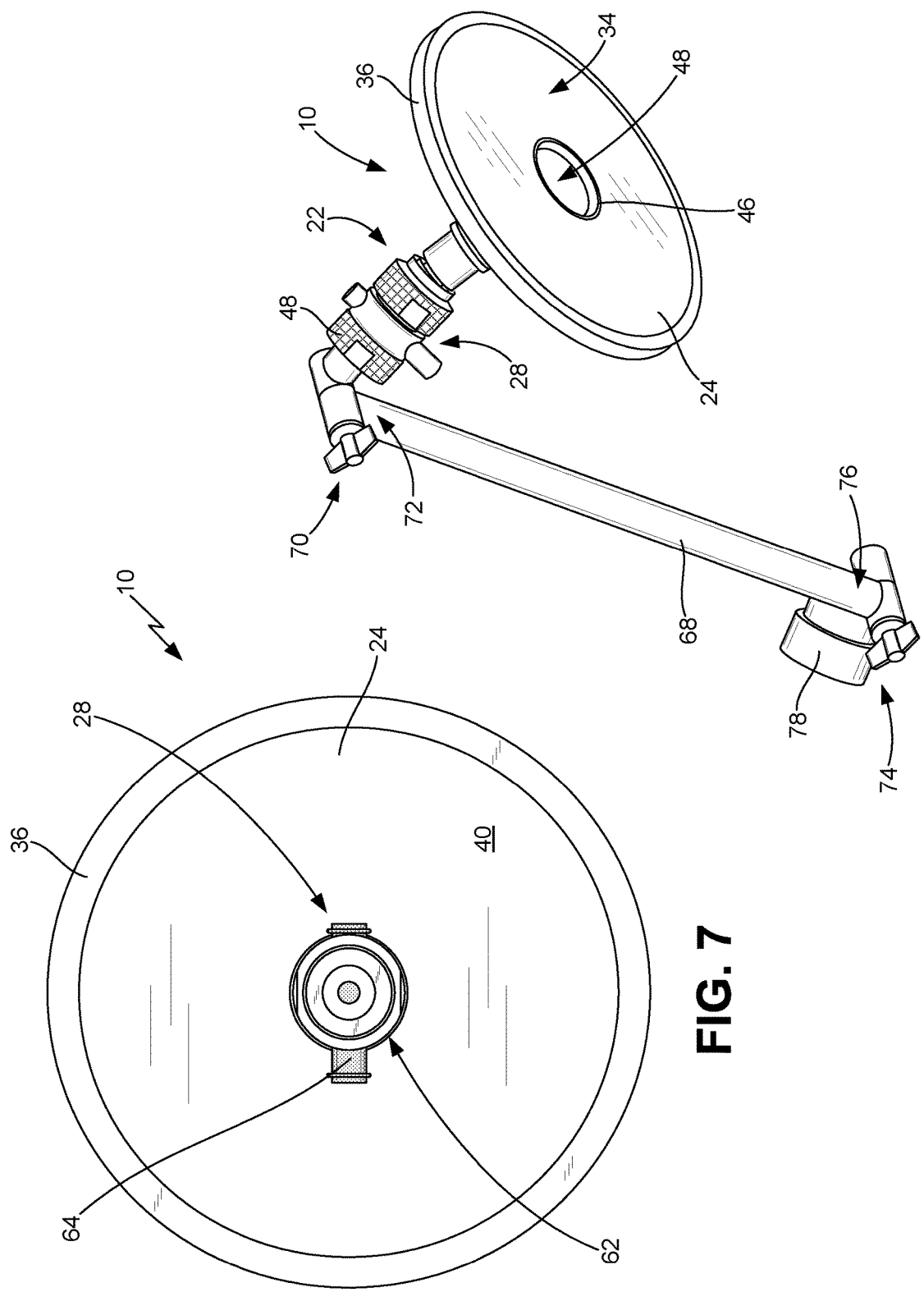

DECORATIVE SHOWERHEAD AND MIRROR

BACKGROUND OF THE INVENTION

A. Field of the Invention

The field of the present invention relates generally to showerheads, mirrors and like apparatuses that are utilized in a shower while a person is showering. In particular, the present invention relates to showerheads and mirror apparatuses that are configured to allow a person to shave or accomplish other grooming activities while he or she is taking a shower. Even more particularly, the present invention relates to such mirror apparatuses that are configured to be securely mounted in the shower and to reduce the likelihood of the mirror becoming unusable due to fogging over as a result of steam in the shower.

B. Background

The use of mirrors and like apparatuses in a shower to accomplish one or more objectives, particularly grooming objectives, that can either be better or easier to perform in the shower is generally well known in the relevant art. For instance, many people place or install a mirror in the shower to use for shaving or other grooming activities. The ready availability of flowing water for rinsing the skin and/or for rinsing the shaving tool, whether before, during or after shaving, and the heat of the water in the shower tend to provide an improved shaving experience for most people. The mirror can be placed in the shower so as to be advantageously positioned for use to shave a person's face, arm pits, legs or other body parts. In certain shower/mirror configurations, the mirror will be attached to an adjustable, outwardly extending arm or other device so that the person taking the shower can move the mirror around to the best position for him or her for use while shaving or performing other grooming activities.

With regard to installation of a mirror in a shower, perhaps the most common method of supporting a mirror in a shower is with the use of a suction cup mechanism that interconnects, typically pivotally, the mirror and a vertical wall in the shower. These suction cup mechanisms are integral or attached to the mirror and are provided with a suction cup that is configured to releasably engage the wall, typically by pivoting a portion of the mechanism relative to the suction cup to stick the suction cup to the wall. Although the suction cup mechanisms generally work well for most surfaces, they can be difficult to firmly stick to some shower wall surfaces and will tend to allow the mirror to slide downward over time. In addition, such mechanisms can spontaneously disengage from the wall and cause the entire mirror and suction cup mechanism to fall to the floor of the shower, which can damage the mirror, suction cup mechanism and/or the floor. A limitation of most of these types of mirror installations is that the typical suction cup mechanism is not configured for use with an adjustable arm or the like and, as a result, they allow very limited movement of the mirror relative to the wall, making it difficult to use the same mirror for shaving a face or other upper areas of the user's body and for shaving legs or other lower areas of his or her body.

Another common method of installing and using a mirror in a shower is to stand or lean the mirror on a surface associated with the shower wall, such as a soap dish attached to or in the wall or other alcoves in the wall, or on a rack or other apparatus located in the shower. Unfortunately, standing or leaning the mirror on or against a surface in the shower is generally very risky with regard to the likelihood of knocking the mirror to the shower floor. As set forth above, this can damage the mirror, mechanism or floor. Although the mirror can be moved to allow the user to use the mirror for various places of his or her body, this either requires finding another place to stand or lean the mirror or the user has to hold the mirror while attempting to accomplish the grooming objective with only one hand.

Yet another method of installing and using a mirror in the shower is to hang the mirror from the pipe, commonly referred to as a shower arm, that extends outward from the shower wall to direct water to the nozzle or to hang the mirror from another object that is attached to or positioned against the shower wall. Typically, the mirror will be attached to a string, rope, elastic band or other item that supports the mirror below the pipe or object. As with the various other configurations for installing and using a mirror in the shower described above, this configuration of installing the mirror generally provides limited movement of the mirror for the user and/or requires the person to utilize at least one of his or he hands to position the mirror where desired for use.

If desired, a mirror can be fixedly attached to a shower wall by drilling holes in the shower wall and then anchoring the mirror to the wall. Because most shower walls are made out of tile or other generally hard materials, drilling the required holes can be somewhat difficult and, typically, require the services of a professional who is familiar with working with tile and the like. Once attached to the wall, the mirror usually cannot be moved. To overcome this limitation, some installations use a mirror that is attached to an adjustable arm, with the arm being attached to the wall of the shower and configured to allow the user to move and tilt the mirror as he or she deems beneficial.

A well known problem with using a mirror in a shower, no matter how the mirror is installed or otherwise beneficial the mirror may be for the user, is that many mirrors have trouble with the mirrored surface of the mirror becoming fogged over due to the steam that results from taking a warm or hot shower. When this occurs, the mirrored surface becomes virtually useless for the person to see what needs to be seen, such as his or her face, underarms, legs and etc., so that the user can safely and effectively accomplish his or her grooming or other objectives. Although it may be possible for the user to wipe away the fog from the mirrored surface, this action typically only achieves a temporary benefit to the foggy condition of the mirror. To address the foggy mirror problem, the mirrored surface of many mirrors is coated or otherwise manufactured out of materials that are selected to resist becoming fogged up so as to provide better visibility for the user of the mirror when he or she is in the shower. As well known by persons who use "fog-free" mirrors, however, most such coatings or materials do not actually provide a fog-free view of the mirror's mirrored surface. At most, these mirrors tend to provide a somewhat intermittent clear view of what the person is trying to see and, as such, are not always fully helpful when trying to accomplish the grooming objectives.

What is needed, therefore, is an improved mirror apparatus for use in the shower that solves many of the limitations and issues with regard to presently available shower mirrors. More specifically, what is needed is an improved mirror apparatus for use in a shower that can be more securely installed in the shower and which reduces the likelihood the mirrored surface will fog over. The improved mirror should be able to be mounted in the shower so as to at least substantially reduce the risk that the mirror will become disengaged from where it is mounted and fall onto the shower floor. In addition, the improved mirror apparatus should be configured in a manner that substantially reduces problems with fogging that prevent a person from seeing his or her reflection in the mirrored surface of the mirror. The new mirror apparatus should be configured to allow the person using the mirror to adjust the angle of the mirrored surface to better suit his or her needs. Preferably, the new mirror apparatus should also be adaptable for use with an adjustable arm or the like to allow the person to move the mirrored surface to a position where it most benefits him or her with regard to use of the mirror to accomplish one or more tasks, such as shaving and/or other grooming activities. It is also preferred that the new mirror apparatus be relatively easy to install and use and be relatively inexpensive to manufacture.

SUMMARY OF THE INVENTION

The decorative showerhead and mirror of the present invention provides the benefits and solves the problems identified above. That is to say, the decorative showerhead and mirror of the present invention provides a showerhead with improved aesthetics and, when configured with a mirror, is an improved mirror apparatus that solves the problems and limitations with regard to presently available mirror apparatuses for use in a shower or like area. More specifically, the decorative showerhead of the present invention provides an improved visual appearance for the showerhead and provides a base for a mirror that can be more securely installed in a shower and reduces the likelihood the mirrored surface thereof will fog over. The showerhead, with or without the mirror, is integrally formed with or securely attached to the showerhead that is mounted, typically threadably, to the shower arm which extends outward from one of the shower walls in a manner which allows water from the showerhead to be dispersed from the center of the decorative element and, when used as a mirror, from the center of the mirrored surface of the mirror. As such, when used as a mirror, the present invention eliminates the risk that the mirror will become disengaged from where it is mounted and fall onto the shower floor. In addition, because the water from the showerhead flows through the center of the mirror, the showerhead mirror of the present invention will substantially reduce fog from covering the mirrored surface of the mirror. This will reduce the problems with the person using the mirror from not being able to see his or her reflection in the mirrored surface of the mirror. The showerhead mirror of the present invention allows the person using the mirror to adjust the angle of the mirrored surface to better suit his or her needs. In addition, the showerhead mirror can be utilized with an adjustable arm or like apparatus to allow the person to move the mirrored surface to a position where it most benefits him or her. In the preferred configurations, the showerhead mirror of the present invention is easy to install and use and it is relatively inexpensive to manufacture.

In one embodiment of the present invention, the showerhead comprises a showerhead, a tubular post, a base and an aperture in the base. The showerhead has a nozzle body that is structured and arranged to attach, typically threadably, to a shower arm and to allow fluid to controllably flow from the shower arm to a nozzle associated with the showerhead. The showerhead also has a showerhead flange at the nozzle to direct fluid outward from the showerhead. The tubular post is attached to or integral with the showerhead flange. The base has a back surface that is attached to or integral with the tubular post so as to extend a front surface of the base generally perpendicularly outward from the tubular post. The aperture is disposed in the base in alignment with the showerhead nozzle to define a fluid flow passageway through each of the showerhead and the base that allows fluid, typically water, to be discharged from the showerhead through the aperture in the base. In one embodiment, the showerhead further comprises an on/off mechanism to allow the user to controllably substantially shut off or allow the flow of fluid through the showerhead. In one embodiment, the on/off mechanism is associated with a trickle valve. Typically, the showerhead will also comprise a pivot mechanism to allow the user to pivot the showerhead and the base. The showerhead can also include a mirror having a back surface attached to or integral with the front surface of the base, a mirrored surface that is directed outward from the base and an aperture in alignment with the aperture of the base to allow fluid from the fluid flow pathway to be directed outward from the mirrored surface of the mirror. In one configuration, the mirrored surface of the mirror is generally sized and configured in corresponding relation with the base so the mirrored surface substantially covers the front surface of the base. The showerhead can also include a frame (i.e., trim) that is peripherally disposed around the base and the mirror. Preferably, the area of the mirrored surface is at least approximately four times larger than the area of the aperture in the mirror to provide the user with sufficient reflective surface so he or she can accomplish their desired task. Either or both the base and the tubular post can be made out of material that is selected for its heat transfer properties so as to transfer heat from the fluid flowing through the fluid flow passageway to the mirror so as to reduce fogging on the mirrored surface of the mirror. In one embodiment, at least one of the base and the tubular post are made out of metal. With or without the mirror, the showerhead can further comprise a shower arm extension that is disposed between the showerhead and the shower arm, with the shower arm extension comprising at least an elongated tube, a first swivel mechanism pivotally connected to a first end of the elongated tube and an attachment collar adapted to connect the shower arm extension to the shower arm of the shower.

In another embodiment of the present invention, the showerhead comprises a showerhead, a mirror and an aperture in the mirror. As above, the showerhead has a nozzle body structured and arranged to attach to a shower arm and to allow fluid to controllably flow from the shower arm to a nozzle associated with the showerhead, with the showerhead having a showerhead flange at the nozzle to direct fluid outward from the showerhead. The mirror has a back surface and a mirrored surface, with the back surface of the mirror being attached to or integral with the showerhead flange of the showerhead. The aperture in the mirror is aligned with the nozzle of the showerhead to define a fluid flow passageway through each of the showerhead and the mirror to allow fluid to be discharged from the showerhead through the aperture at the mirrored surface. This showerhead can also have a tubular post that is attached to or integral with the back surface of the mirror, with the tubular post interconnecting the mirror and the showerhead flange so as to attach the mirror to the showerhead. In a preferred embodiment, the tubular post and the showerhead flange are cooperatively sized and configured for the showerhead flange to be received in the tubular post. The showerhead can further comprise a base disposed between the showerhead and the mirror, with the base having a back surface and a front surface. The back surface of the base is attached to or integral with the showerhead flange and the mirror is attached to or integral with the front surface of the base. As above, it is preferred that the area of the mirrored surface be at least approximately four times larger than the area of the aperture in the mirror at the mirrored surface. This showerhead can also comprise a shower arm extension that is disposed between the showerhead and the shower arm. In one configuration, the shower arm extension comprises an elongated tube, a first swivel mechanism pivotally connected to a first end of the elongated tube and an attachment collar adapted to connect the shower arm extension to the shower arm. In another configuration, the shower arm extension comprises a second swivel mechanism at a second end of the elongated tube to provide the user with additional flexibility with regard to positioning the mirror in the shower. A frame or trim can be peripherally disposed around the base and the mirror.

Accordingly, the primary object of the present invention is to provide a decorative showerhead and mirror that has the advantages discussed above and elsewhere in the present disclosure and, when utilized as a mirror, which overcomes the various disadvantages and limitations associated with presently available shower mirror apparatuses.

It is an important objective of the present invention to provide a mirror apparatus, configured as a showerhead mirror, that can be more securely installed in a shower and which reduces the likelihood that the mirrored surface of the mirror will fog over during use.

An important aspect of the present invention is that it provides a new mirror apparatus that achieves the goals of the above-described objectives.

Another important aspect of the present invention is that it provides a showerhead mirror that is configured to be more securely installed in a shower and to reduce the likelihood the mirrored surface thereof will fog over when being used in the shower to accomplish various grooming objectives.

Another important aspect of the present invention is that it provides a showerhead mirror which is integrally formed with or securely attached to the showerhead that in turn is mounted, typically threadably, to the shower arm which extends outward from one of the shower walls in a manner which allows the water from the showerhead to be dispersed from the center of the mirrored surface of the showerhead mirror, such configuration preventing the showerhead mirror falling to the floor and reducing the likelihood that the mirrored surface will fog over.

Another important aspect of the present invention is that it provides a showerhead mirror of the present invention that is structured and arranged to allow the person using the mirror to adjust the angle of the mirrored surface to better suit his or her needs and to be adaptable for being utilized with an adjustable arm or like apparatus to provide additional positioning capability to allow the person to move the mirrored surface to a position where it most benefits him or her.

Yet another important aspect of the present invention is that it provides a showerhead mirror of which is easy to install and use and, in the preferred configurations, is relatively inexpensive to manufacture.

As will be explained in greater detail by reference to the attached figures and the description of the preferred embodiments which follows, the above and other objects and aspects are accomplished or provided by the present invention. As set forth herein and will be readily appreciated by those skilled in the art, the present invention resides in the novel features of form, construction, mode of operation and combination of processes presently described and understood by the claims. The description of the invention which follows is presented for purposes of illustrating one or more of the preferred embodiments of the present invention and is not intended to be exhaustive or limiting of the invention. As will be readily understood and appreciated, the scope of the invention is only limited by the claims which follow after the discussion.

BRIEF DESCRIPTION OF THE DRAWINGS

In the drawings which illustrate the preferred embodiments and the best modes presently contemplated for carrying out the present invention:

FIG. 1 is a side perspective view of a prior art shower arrangement showing use of a prior art showerhead and mirror in use in a shower;

FIG. 2 is a side perspective view of a showerhead mirror configured according to one of the preferred embodiments of the present invention shown in use in the shower of FIG. 1;

FIG. 3 is a front perspective view of the showerhead mirror of FIG. 2 shown separate from the shower;

FIG. 4 is a side view of the showerhead mirror of FIG. 3;

FIG. 5 is an exploded side view of the showerhead mirror of FIG. 4;

FIG. 6 is a bottom view of the showerhead mirror of FIG. 3 showing the mirrored surface thereof;

FIG. 7 is a top view of the showerhead mirror of FIG. 3;

FIG. 8 is a side perspective of the showerhead mirror of FIG. 3 shown attached to an adjustable arm apparatus;

DETAILED DESCRIPTION OF THE PREFERRED EMBODIMENTS

Figure 10:
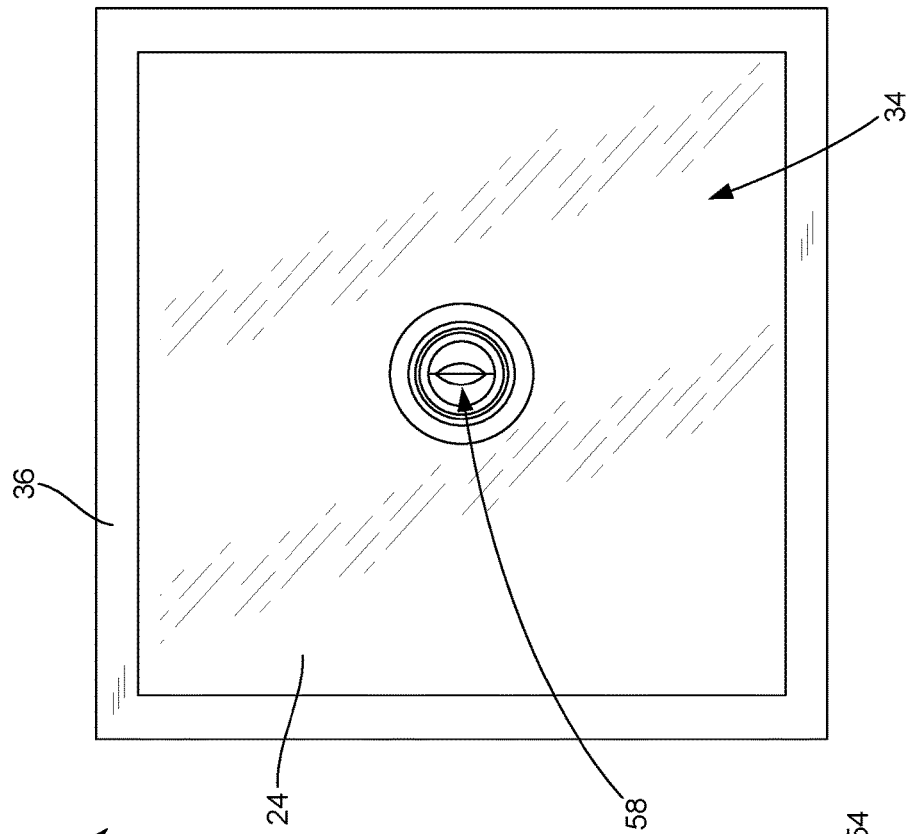
FIG. 10 is a bottom view of an alternative embodiment of the showerhead mirror of the present invention showing use of a square-shaped mirror to provide the mirrored surface.

With reference to the figures where like elements have been given like numerical designations to facilitate the reader's understanding of the present invention, the preferred embodiments of the present invention are set forth below. The enclosed figures are illustrative of several potential preferred embodiments and, therefore, are included to represent several different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures included herewith generally describe and show particular materials, shapes and configurations for the various components of the showerhead and mirror of the present invention, those persons skilled in the art will readily appreciate that the present invention is not so limited. In addition, the exemplary embodiments of the present device are shown and described with only those components which are required to disclose the present invention. It may be that some of the necessary elements for attaching and using the present invention are not shown or are not necessarily described below, but which are well known to persons skilled in the relevant art. As will be readily appreciated by such persons, the various elements of the present invention that are described below may take on any form consistent with forms that are readily realized by persons of ordinary skill in the art having knowledge of showerheads and mirrors.

A showerhead mirror that is configured pursuant to various preferred embodiments of the present invention is shown generally as 10 in FIGS. 2-8. A shower-mirror system including the showerhead mirror 10 is shown as 12 in FIG. 2. A prior art shower-mirror system, shown as 14 in FIG. 1, comprises the shower 16 having at least one shower wall 18 from which extends a shower arm 20 to position and deliver water to a showerhead 22 that sprays water onto a person who is showering in the shower 16 and the separate mirror 24. As well known in the art, the shower arm 20 is in fluid flow communication with a source of water or other liquid, the flow of which is controlled by one or more flow control valves that are operated, typically, by the person showering in the shower 16. Most showers 16 have a shower flange 26 where the arm 20 extends from the wall 18, as shown in FIG. 1. The showerhead 22 can include an on/off mechanism 28 that allows the person taking the shower to easily stop the flow of water to the showerhead 22 to allow the person to perform certain activities, such as lathering up with soap or applying shampoo, without being sprayed with water. The configuration and use of showerheads 22 for use in a shower 16 are generally well known in the art.

The prior art mirror 24 shown in FIG. 1 is attached to the wall 18 using a suction cup mechanism 30 that interconnects, typically pivotally, the mirror 24 and the shower wall 18. The suction cup mechanisms 30 are integral or attached to the mirror 24 and include a suction cup 32, with the suction cup mechanism 30 being structured and arranged for the suction cup 32 to releasably engage the wall 18, typically by pivoting a portion of the suction cup mechanism 30 relative to the suction cup 32 to stick the suction cup 32, and therefore the mirror 24, to the wall 18. The prior art mirror 24 has a mirrored surface 34 that the person in the shower 16 utilizes to view himself or herself so that he or she may more easily, safely and effectively perform his or her desired grooming or other activities. Unfortunately, as set forth above, the mirrored surface 34 frequently becomes so fogged over that the mirror 24 is no longer useful to the user with regard to performing the desired activities. Although the mirrored surface 34 of most mirrors 24 that are intended to be utilized in a shower 16 is coated or otherwise manufactured out of materials that are selected to resist becoming fogged up to provide better visibility for the user of the mirror 24 when he or she is in the shower 16, these coatings and materials are generally not very effective at providing fog-free viewing of the mirrored surface 34. At most, these mirrors tend to provide a somewhat intermittent clear view through the mirrored surface 34. As shown in FIG. 1, the mirror 24 often has one or more trim or frame members peripherally disposed about the mirrored surface 34.

As set forth in the Background, the various arrangements for placing or attaching a mirror 24 in a shower 16 are not very effective at securing the mirror 24 in place and/or do not allow the user much flexibility with regard to the position of the mirror 24. The showerhead mirror 10 of the present invention secures the mirror 24 to prevent the mirror 24 from falling to the floor of the shower 16 and significantly reduces the likelihood the mirrored surface 34 will become unusable due to being fogged over. As shown in FIG. 2, the showerhead mirror 10 of the present invention attaches to the shower arm 20 to position the mirror 24 thereof at the end of the showerhead 22. As explained in more detail below, the showerhead 22 is attached to or integrally formed with the mirror 24 and then attached to the shower arm 20 such that the flow of water from the showerhead 22 will be directed through the mirrored surface 24. Because the showerhead mirror 10 is attached, typically threadably, to the arm 18 that extends outwardly from the shower wall 18, the mirror 24 will not be able to fall onto the floor of the shower 16. The flow of the water through the mirror 24 significantly reduces the likelihood the mirrored surface 34 will fog over and become unusable. In addition, as also set forth below, the present invention also provides a decorative showerhead having an enlarged area that can be utilized without the mirror 24.

Figure 9:
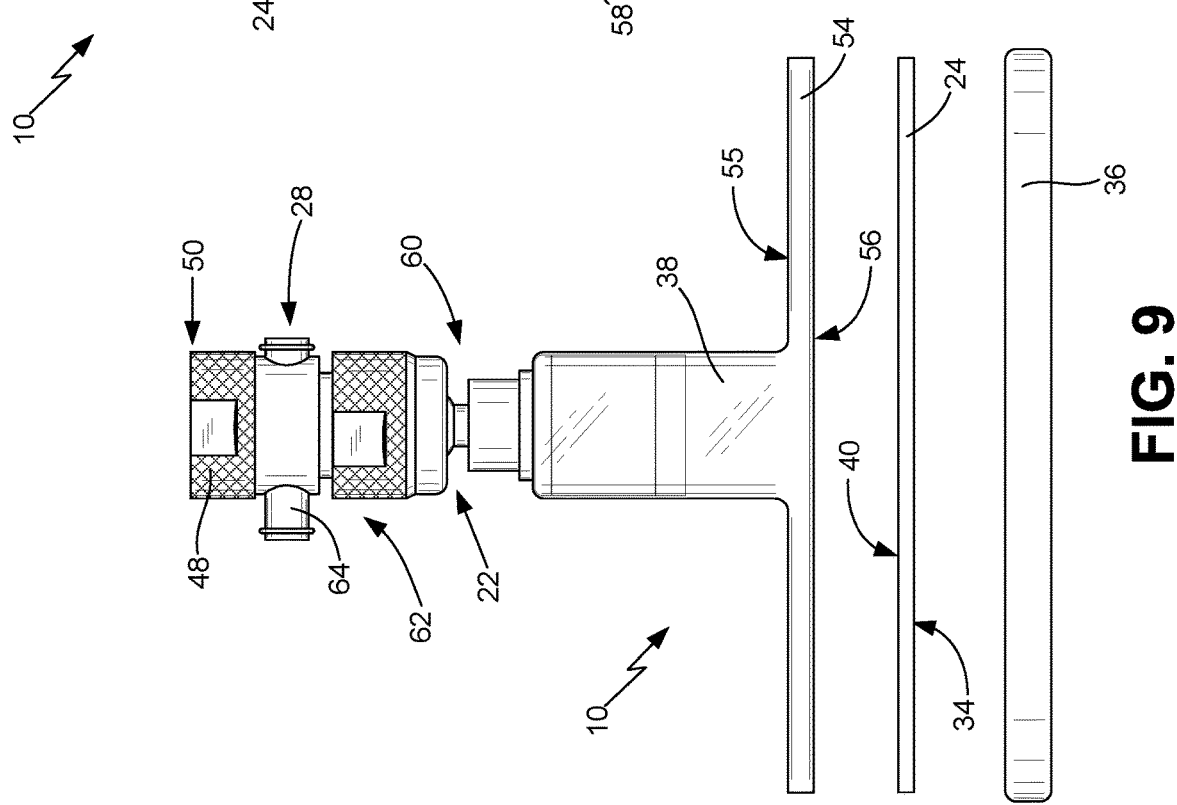
FIG. 9 is a partially exploded side view of the showerhead mirror of FIG. 3 with the mirror and trim shown separate from the base, which is shown attached to the showerhead.

The mirror 24 of the showerhead mirror 10 of the present invention has a tubular post 38 attached to or integral with a back surface 40 of the mirror 24 (directly or indirectly), with the tubular post 38 being attached to or integral with a flange 42 of the showerhead 22 to define a fluid flow passageway 44 that extends from the shower arm 20 through showerhead 22, the post 38 and an aperture 46 in the mirror 24 to allow water to be discharged from the mirror 24 at the mirrored surface 34, as best shown in FIGS. 2-5. In one embodiment, which may be a preferred embodiment, of the showerhead mirror 10 of the present invention, the showerhead 22 has a nozzle body 48 that is internally threaded (not shown) at the proximal end 50 of the showerhead 22 to threadably engage external threads (not shown) at the distal end of the shower arm 20 to securely attach the showerhead mirror 10 to the shower arm 20. Water from the shower arm 20 will flow through the showerhead 22, as may be controlled by the showerhead 22 and/or the on/off mechanism 26, along the fluid flow passageway 44 to exit out the distal end 52 of the showerhead 22 and out the mirror 24. In one embodiment, the back surface 40 of the mirror 24 and tubular post 38 are made out of plastic, metal or like materials and integrally formed into a base 54 with a back surface 55 and a front surface 56, as shown in FIG. 9, with the mirror 24, having a fog-free mirrored surface 34, being a separate component that is attached (though shown separate in FIG. 9) to the front surface 56 of the base 54. The tubular post 38 is attached to or integral with the back surface 55 of the base 54. In the embodiment shown in FIGS. 2-9, the base 54 and mirror 24 are round. In the embodiment shown in FIG. 10, both the base 54 and mirror 24 are square. As will be readily appreciated by persons skilled in the art, both the base 54 and mirror 24 can be any shape that may be desired (i.e., rectangle, oval and etc.) by the manufacturer and user. The mirror 24 will be cooperatively sized and configured to cover at least substantially the entire front surface 56 of the base 54. Generally, in any configuration there will be decorative trim or frame 36 disposed around the peripheral edge of the base 54 and mirror 24. In another embodiment, the base 54 can be utilized with the showerhead 22 but without the mirror 14 and/or the trim 36 to provide a desired configuration for the showerhead 22 having a base 54, as set forth below and shown in FIG. 12.

In one of the preferred embodiments, the mirror 24 is bonded to the flat, stiff front surface 56 of the disc-shaped base 54. The mirror 24 is of the type that is configured to be fog-free. The trim 36 goes around the peripheral junction of the mirror 24 and the base 54 to reinforce the mirror 24 and base 54, provide aesthetic benefits and to provide the user something other than the mirrored surface 34 to grab onto when he or she is adjusting the position of the showerhead mirror 10 so as to reduce the likelihood of getting fingerprints on the mirrored surface 34 of mirror 24. In a preferred method of manufacturing the showerhead mirror 10, the tubular post 38 of the base 54 is heated and then press fit over the flange 42 of the showerhead 22. In a preferred configuration, best shown with regard to FIGS. 3-5, the nozzle 58 of the showerhead 22 is attached to a pivoting mechanism 60, such as a ball joint swivel, that allows the person showering to controllably pivot the mirror 24 (namely, adjust the position by pivoting the mirror 24 and then have the mirror 24 stay in position) and the pivoting mechanism 60 is attached to a push button trickle valve 62 having the on/of mechanism 28 that allows the person to shut off the flow of water to a trickle so the person can lather up with soap or use the mirror 24 to shave or accomplish other grooming activities without having the full flow of the water coming out through the aperture 46. In one embodiment, the on/off mechanism 28 comprises a valve rod element 64 that moves back and forth to close-off or open the flow from the shower arm 20 through the push button trickle valve 42 and the remaining components of the showerhead 22. The use of such valve rod elements 64 are well known in the art (and described in U.S. Pat. No. 4,191,332 to De Langis, et al.).

Although a wide variety of different types of showerheads 22 can be utilized with the showerhead mirror 10 of the present invention, in a preferred embodiment the showerhead 22 is configured with the spray control elements of the uniform droplet spray nozzle described in U.S. Pat. No. 7,185,830 to Malcolm (who is the present inventor). As described in that patent, this nozzle utilizes a turbulent flow mechanism and a flow separating mechanism in the flow passage of the nozzle and a converging mechanism at the outlet of the nozzle body to provide a relatively uniform droplet size spray. A showerhead 22 having the attributes of this nozzle allows the use of much lower flow rates to achieve the same shower "feel" that is achieved with higher flow rate nozzles, which will conserve water. As stated above, other low flow rate showerheads 22 or even showerheads 22 that are not considered or designated as "low flow" can be utilized with the showerhead mirror 10 of the present invention. As will be readily appreciated by persons skilled in the art, the showerhead 22 can include or not include the pivoting mechanism 60 and push button trickle valve 62, though those components are likely to be considered useful and, therefore, preferred.

The embodiment of FIG. 8 shows the showerhead mirror 10 of the present invention being utilized with an adjustable shower arm extension 66 that is structured and arranged to provide the person taking a shower with more flexibility with regard to the position of the mirrored surface 34 of the mirror 24. The shower arm extension 66 shown in FIG. 8 has an elongated hollow tube 68 with a first swivel mechanism 70 at a first end 72 of the tube 68, a second swivel mechanism 74 at the second end 76 of the tube 68 and an internally threaded attachment collar 78 at or near the second end 76 of the tube 68 that is sized and configured to threadably attach to the distal end of the shower arm 20. The internally threaded nozzle body 48 attaches to an externally threaded area (not shown) near the first swivel mechanism 70 to secure the showerhead mirror 10 to the shower arm extension 66. Using the swivel mechanisms 70/74 the person taking a shower can move the showerhead mirror 10 around in the shower 16 so he or she can better see the areas of his or her body where the grooming (i.e., shaving, plucking or the like) or other activity is desired. As will be readily understood by persons who are skilled in the relevant art, a wide variety of differently configured shower arm extensions can be utilized with the showerhead mirror 10 of the present invention. For instance, the elongated tube 68, through which the water flows from the shower arm 20 to the showerhead 22 of the showerhead mirror 10, can be of a variety of different lengths and/or be extendable (i.e., telescopically configured). In addition, the shower arm extension 66 can have more or less than the two swivel mechanisms 70/74 shown in FIG. 8.

In order to be useful as a mirror 24, the mirrored surface 34 of the showerhead mirror 10 must be sufficiently larger than the aperture 46 through which the showerhead 22 discharges water along the fluid flow passageway so that the person can see enough of the reflection of himself or herself to be useful for the intended purpose (i.e., shaving or the like). In one embodiment, the diameter of the aperture 46 for the showerhead flange 42 is approximately one inch or less and the diameter of the mirror 24 is approximately five inches, with the mirrored surface 34 being the area between the edge of the mirror 24 and the aperture 46. As will be readily appreciated by persons skilled in the art, a large showerhead flange 42 will require a larger aperture 46, which will reduce the amount of area available for the mirrored surface 34 that is utilized by the user or require a larger mirror 24 and, typically, a larger base 54. Generally, it is preferred that the diameter of the round mirror 24 (defined by the edge of the mirrored surface 24) be at least four times greater than the diameter of the aperture 46, which results in the area of the mirrored surface 34 being approximately four times greater than the area of the aperture 46. For non-round designs, such as shown in FIG. 10, the area of the mirrored surface 34 should also be at least four times greater than the area of the aperture 46 to provide a desirable amount of mirrored surface 34 for use by the person while shaving or accomplishing other activities.

Figure 11:
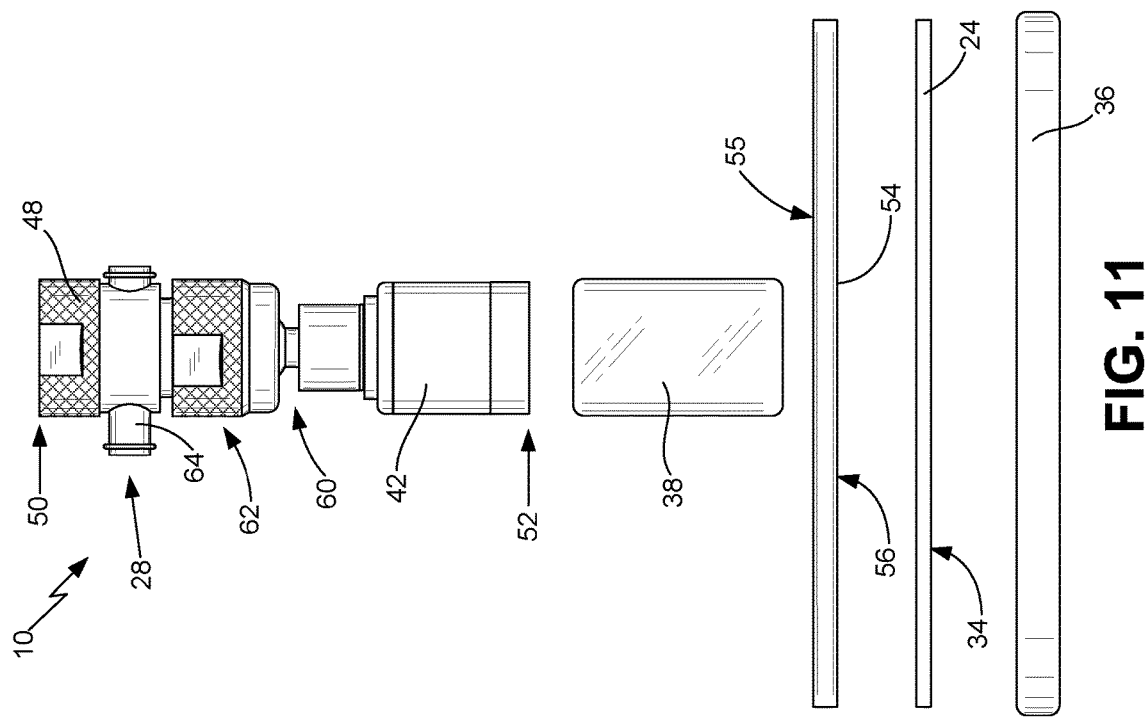
FIG. 11 is a partially exploded side view showing use of a base that is separate from the tubular post and mirror.

As set forth above, one of the advantageous of the showerhead mirror 10 of the present invention is that the hot water which flows through fluid flow passageway 44 and out the aperture 46 will reduce the likelihood of the mirrored surface 34 fogging over. As well known in the art, normally the hot water in the shower 16 causes a mirrored surface 34, often even if treated to be fog-free, to fog over such that it is nearly useless for the person taking a shower to use to shave or perform other tasks. In one embodiment, the base 54 and tubular post 38 can be integrally formed and made out of a plastic or the like. In what may be a preferred embodiment, shown in FIG. 11, at least the base 54 is made out of metal or other material having a greater heat transfer capability, with the tubular post 38 attached to the back surface 55 of the metal base 54. In yet another embodiment, both the base 54 and the tubular post 38 are made out of metal or other heat transfer material. With the base 54 being made out of metal or other material which is selected for its ability to more efficiently transfer heat from the water flowing through the showerhead mirror 10, the heat from the hot water will more efficiently transfer to the mirror 24 and be much more likely to prevent the mirrored surface 34 from fogging over. With the tubular post 38 made out of metal or other efficient heat transfer material, the heat from the hot water will likely even more efficiently transfer to the mirror 24. In one embodiment, the base 54 can be a thin metal sheet with the tubular post 38 being attached thereto using adhesives or by welding or the post 38 being made integral with the base 54.

Figure 12:
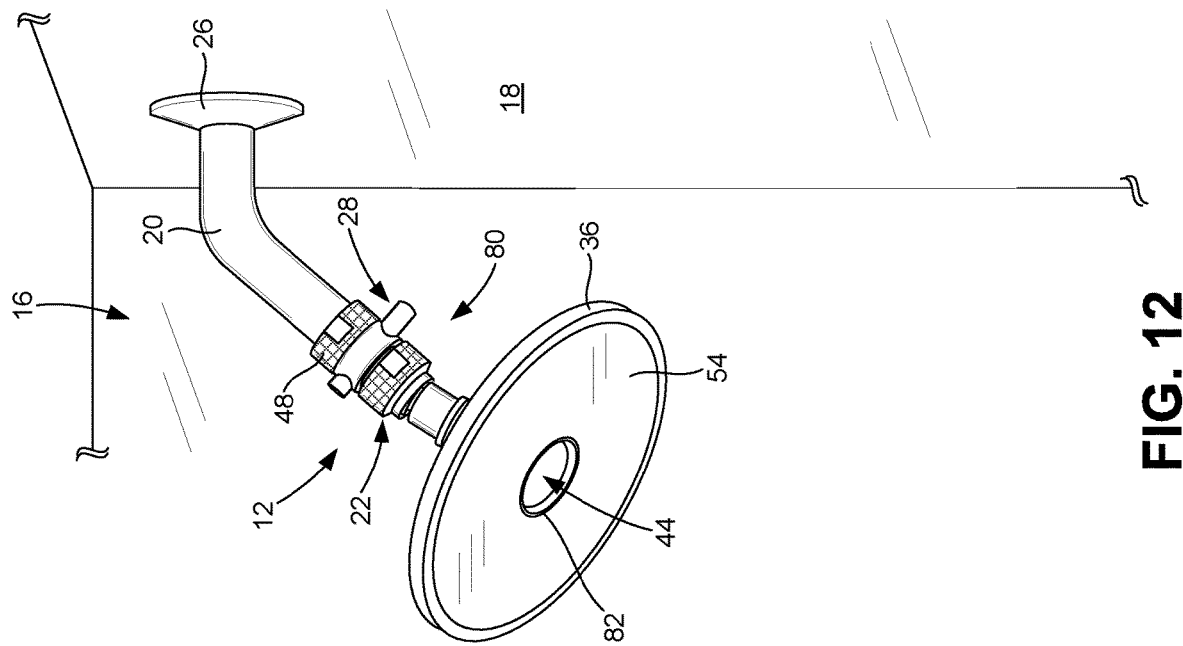
FIG. 12 is a side perspective view of a decorative showerhead shown in use in the shower with the showerhead having a base instead of a mirror.

The embodiment of FIG. 12 shows the showerhead of the present invention being configured as a decorative showerhead, which is shown as 80. Unlike the embodiment of the showerhead mirror 10, the decorative showerhead 80 does not have a mirror 24 and, as a result, does not have a mirrored surface 34. Instead, as shown in FIG. 12, the area around the aperture 46 is the base 54. As set forth above, the base 54 can be plastic, metal or a wide variety of other materials that are selected for the aesthetic value. In one embodiment, the base 54 can be plastic that is dyed or otherwise colored as may be desired by the user. Design elements, as set forth above with regard to the mirrored surface 34, can be incorporated into or onto the front surface 56 of the base 54.

The showerhead mirror 10 can be manufactured and sold as a replacement item for prior art shower-mirror systems 14, such as that shown in FIG. 1, where the user would simply remove (typically by unthreading) the prior art showerhead 22 from the existing shower arm 20 and then attaching (typically by threading) the showerhead mirror 10 of the present invention to the shower arm 20. Once attached to the shower arm 20, which is solidly fixed in place in the shower 16, the mirror 24 of showerhead mirror 10 will not fall to the floor of the shower 16, as frequently happens with prior art mirror attachment devices, such as the suction cup mechanism 30 shown in FIG. 1. The base 54 and/or the mirrored surface 34 will be generally perpendicularly disposed relative to the showerhead flange 42 and, if used, the tubular post 38. In use, the person taking the shower would merely control the flow of water to the showerhead 22 as he or she normally would and then use, as desired, the mirrored surface 34 of the mirror 24 to accomplish whatever objectives may be desired, such as shaving or the like. In the preferred configurations, the user can tilt the mirror 24 using the pivoting mechanism 60 to better position the mirrored surface where it will be most beneficial for him or her. The push button trickle valve 62, if utilized, will allow the user to lower the flow of water through the showerhead mirror 10 to a trickle while he or she is applying soap to their body, shaving or accomplishing other objectives without wasting water and without the flow of the water interfering with the task.

In an alternative embodiment of the present invention, the mirrored surface 34 can comprise a design element on, over or incorporated into the mirror 24. As well known in the art, many mirrors have a team logo, business trademark or other design elements (i.e., trees, animals, plants, insects, fish or the like) on the mirrored surface thereof. With regard to the showerhead mirror 10 of the present invention, one or more design element can be incorporated on the mirrored surface 24 around the aperture 46. A wide variety of design elements can be utilized.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there are numerous components described herein that can be replaced with equivalent functioning components to accomplish the objectives of the present invention.

What is claimed is:

1. An apparatus for use in a shower, comprising:
    a showerhead comprising a nozzle body wherein one end of said body is attached to a shower arm or to an extension thereof, and an opposite end of said body is attached to a nozzle to allow fluid to controllably flow from the shower arm to said nozzle, said showerhead further comprising a flange engaged with said nozzle;
    a tubular post attached around or integral with said flange;
    a base having a back surface, said back surface of said base attached to or integral with said tubular post such that said back surface extends generally perpendicularly outward from said tubular post;
    a first aperture in said base, said first aperture being axially aligned with said nozzle, wherein said nozzle body, nozzle and first aperture define a fluid flow passageway allowing fluid to be discharged through said first aperture; and
    a mirror attached to a front surface of said base, said mirror having a reflective front surface and having a second aperture therethrough that is axially aligned with said nozzle and said first aperture such that fluid only exits from said nozzle through said apertures.

2. The apparatus of claim 1 further comprising an on/off mechanism associated with said showerhead so as to controllably substantially shut off or allow the flow of fluid through said showerhead.

3. The apparatus of claim 2 further comprising a pivot mechanism associated with said apparatus so as to pivot said showerhead and said base.

4. The apparatus of claim 3 further comprising a shower arm extension disposed between said nozzle body and the shower arm, said shower arm extension comprising at least an elongated tube, a first swivel mechanism pivotally connected to a first end of said elongated tube and an attachment collar adapted to connect said shower arm extension to the shower arm.

5. The apparatus of claim 1, wherein said reflective surface of said mirror is generally sized and configured in corresponding relation with said base so said reflective surface substantially covers said front surface of said base.

6. The apparatus of claim 5 further comprising a frame peripherally disposed around said base and said mirror.

7. The apparatus of claim 6, wherein the area of said reflective surface is at least approximately four times larger than the area of said aperture in said mirror.

8. The apparatus of claim 1, wherein at least one of said base and said tubular post are made out of metal so as to transfer heat from fluid flowing through said fluid flow passageway to said mirror so as to reduce fogging on the reflective surface of said mirror.

9. An apparatus for use in a shower comprising:
    a nozzle body structured and arranged to attach at one end to a shower arm or to an extension thereof, to allow fluid to controllably flow from the shower arm or from said extension to a nozzle attached at an opposite end of said nozzle body, and a flange at said nozzle to direct fluid outward from said nozzle;
    a mirror having a back surface and an opposite mirrored surface, said back surface of said mirror integral with said flange; and
    an aperture in said mirror, said aperture being axially aligned with said nozzle, wherein said nozzle body, nozzle and aperture define a fluid flow passageway to allow fluid to be discharged from said nozzle through said aperture.

10. The apparatus of claim 9 further comprising a shower arm extension disposed between said nozzle body and the shower arm, said shower arm extension comprising at least an elongated tube, a first swivel mechanism pivotally connected to a first end of said elongated tube and an attachment collar adapted to connect said shower arm extension to the shower arm.

11. The apparatus of claim 10 further comprising a second swivel mechanism at a second end of said elongated tube.

12. The apparatus of claim 9, wherein the area of said mirrored surface is at least approximately four times larger than the area of said aperture in said mirror at said mirrored surface.

13. The apparatus of claim 9 wherein each of said nozzle body, said nozzle, and said mirror are made of metal such that heat from fluid flowing through said apparatus is transferred from said flow of fluid to said mirrored surface to reduce fogging thereof.

14. A showerhead apparatus, comprising:
- a nozzle body having a first end attached to a shower arm or to an extension thereof, and an opposite end attached to a nozzle;
- an on/off mechanism associated with said nozzle body to control the flow of fluid through said apparatus;
- a tubular post attached to or engaged around said nozzle body;
- a mirror integral with said tubular post and extending generally perpendicularly away from said post, said mirror having a reflective front surface, an opposite back surface, and an aperture therethrough, said aperture being axially aligned with said nozzle to allow fluid to exit from said nozzle through said aperture.

15. The apparatus of claim 14 wherein each of said nozzle body, said nozzle, said tubular post and said mirror are made of metal such that heat from fluid flowing through said apparatus is transferred from said flow of fluid to said reflective front surface to reduce fogging thereof.

16. The apparatus of claim 14 further comprising a shower arm extension disposed between said nozzle body and the shower arm, said shower arm extension comprising at least an elongated tube, a first swivel mechanism pivotally connected to a first end of said elongated tube and an attachment collar adapted to connect said shower arm extension to the shower arm.

17. The apparatus of claim 16 further comprising a second swivel mechanism at a second end of said elongated tube.

* * * * *